United States Patent [19]

Röhm

[11] Patent Number: 4,700,956
[45] Date of Patent: Oct. 20, 1987

[54] LOCKABLE AND SELF-TIGHTENING HAMMER-DRILL CHUCK

[76] Inventor: Günter H. Röhm, Heinrich-Röhm-Str. 50, D-7927 Sontheim, Fed. Rep. of Germany

[21] Appl. No.: 808,894

[22] Filed: Dec. 13, 1985

[30] Foreign Application Priority Data

Dec. 15, 1984 [DE] Fed. Rep. of Germany ....... 8436752

[51] Int. Cl.$^4$ ..................... B23B 31/04; B25D 17/08
[52] U.S. Cl. .................................... 279/19.4; 173/48; 279/62
[58] Field of Search ................... 279/19, 19.1, 19.2, 279/19.3, 19.4, 19.5, 19.6, 19.7, 60, 61, 62, 63, 64, 65, 1 S, 1 R, 1 ME, 1 K; 408/239 R, 240; 173/48

[56] References Cited

U.S. PATENT DOCUMENTS

| | | | |
|---|---|---|---|
| 2,262,849 | 11/1941 | Knecht | 279/1 F |
| 2,427,974 | 10/1947 | Otterman | 279/1 |
| 2,684,856 | 7/1954 | Stoner | 279/61 |
| 4,213,622 | 7/1980 | Rohm | 279/1 K |
| 4,277,074 | 7/1981 | Kibens | 279/60 |
| 4,381,116 | 4/1983 | Futter | 279/62 |

FOREIGN PATENT DOCUMENTS 2030485   4/1980   United Kingdom .................. 279/60

Primary Examiner—Z. R. Bilinsky
Attorney, Agent, or Firm—Karl F. Ross; Herbert Dubno; Andrew Wilford

[57] ABSTRACT

A hammer drill chuck according to the invention has a chuck body centered on an axis and formed with an axially forwardly open hole normally receiving a drill bit, respective jaws displaceable in the body and having front ends radially engageable with a bit in the hole, and an adjustment ring engaged around the body, fitting with the jaws such that rotation of the ring in one direction advances the jaws in the body and rotation in the opposite direction retracts the jaws for respectively clamping and unclamping the drill bit in the front portion, and formed with axially backwardly directed teeth. A locking sleeve axially displaceable on the body is formed with forwardly directed teeth engageable with the teeth of the ring for rotational coupling of the sleeve and the ring, an axially relatively short, radially inwardly open, and axially forwardly open slot, and an axially relatively long, radially inwardly open, and axially forwardly open slot adjacent the short slot and of a predetermined angular width. A radially outwardly projecting stop fixed on the chuck body is of a predetermined angular width substantially less than that of the long slot. This stop is engageable in either of the slots. A spring is engaged between the sleeve and the chuck body for urging the sleeve axially forward on the chuck body and for urging the sleeve angularly in the one direction.

8 Claims, 5 Drawing Figures

LOCKABLE AND SELF-TIGHTENING HAMMER-DRILL CHUCK

FIELD OF THE INVENTION

The present invention relates to a drill chuck. More particularly this invention concerns a hammer-drill chuck which can be locked once the bit is clamped in it.

BACKGROUND OF THE INVENTION

The standard hammer-drill chuck has a chuck body that is rotationally fixed but limitedly axially reciprocal on the drill spindle. This body is formed with an axially throughgoing passage into the rear end of which the drive spindle is engaged and into the front of which the shank of a drill bit is engaged. In addition the body is normally formed with three guide bores inclined to the axis and having inner front ends opening into the hole at the front end of the passage and outer rear ends opening at a radially outwardly open groove on the body. Respective jaws slidable in these guide bores have front ends engageable radially with the shank of the drill bit and rear ends formed with radially outwardly projecting teeth exposed in the groove.

The jaws are normally urged radially outward by springs and are displaced radially by an adjustment ring which is provided in the groove and which has a screwthread that mates with the teeth on the jaws. This ring is formed of a pair of semicircular parts secured together by a knurled sleeve. As a rule the radially inner surface of the ring rides directly on the floor of the groove, so that this ring is supported radially in front of and in back of the apertures where the guide bores open into the groove.

The jaws hold the drill bit so it is centered on the spindle axis, and the front end of the drive spindle acts as a hammer on the rear end of the drill bit. The spindle rotates and axially reciprocates slightly, with the rotation being transmitted via the body and jaws to the bit and the reciprocation being effective directly on the bit. Thus the bit normally moves somewhat axially relative to the jaws.

In order to prevent the chuck from loosening during drilling, a particularly vexsome problem in a hammer drill, it is standard to provide a locking sleeve that has teeth axially forwardly engageable with backwardly directed teeth on the adjustment ring. A spring urges this sleeve forward into a position with the teeth meshing. A stop on the chuck body can engage in either of two adjacent axially forwardly open slots in the sleeve. One of these slots is fairly long so that when the stop is engage in it the sleeve can move forward enough to allow the the teeth to mesh, and in this position the stop is blocked angularly by the sides of the long slot so that the sleeve and also the adjustment ring are prevented from rotating on the chuck body.

The other slot is shorter so that when the stop is engaged in it the teeth cannot mesh. This short slot therefore serves to hold the sleeve back out of engagement with the adjustment ring while same is being rotated to clamp or release a bit from between the jaws controlled by the ring. Thus when a bit is being changed the sleeve is pulled back and rotated somewhat to align the stop with the short slot and the sleeve is released so that it locks in the back position. Once the new bit is in place the sleeve is again pulled back and released when in alignment with the long slot to lock the adjustment ring on the chuck body.

In use it is possible for the clamping jaws to work their way into the shank of the drill bit, thereby loosening the connection between this bit and the chuck. In such a situation it is necessary for the user to unlock the adjustment sleeve, retighten the chuck, and relock the sleeve. Obviously this is not convenient, so that instead the loose connection and the sloppy drilling produced thereby is tolerated until drilling is too difficult or impossible. This is a particular problem with hammer drilling where the jaws should rotationally couple the chuck body and drill bit while permitting limited relative axial movement.

OBJECTS OF THE INVENTION

It is therefore an object of the present invention to provide an improved hammer-drill chuck.

Another object is the provision of such a hammer-drill chuck which overcomes the above-given disadvantages, that is which is of the locking type but which also is self-tightening.

SUMMARY OF THE INVENTION

A hammer drill chuck according to the invention has a chuck body centered on an axis and formed with an axially forwardly open hole normally receiving a drill bit, respective jaws displaceable in the body and having front ends radially engageable with a bit in the hole, and an adjustment ring engaged around the body, fitting with the jaws such that rotation of the ring in one direction advances the jaws in the body and rotation in the opposite direction retracts the jaws for respectively clamping and unclamping the drill bit in the front portion, and formed with axially backwardly directed teeth. A locking sleeve axially displaceable on the body is formed with forwardly directed teeth engageable with the teeth of the ring for rotational coupling of the sleeve and the ring, an axially relatively short, radially inwardly open, and axially forwardly open slot, and an axially relatively long, radially inwardly open, and axially forwardly open slot adjacent the short slot and of a predetermined angular width. A radially outwardly projecting stop fixed on the chuck body is of a predetermined angular width substantially less than that of the long slot. This stop is engageable in either of the slots. A spring is engaged between the sleeve and the chuck body for urging the sleeve axially forward on the chuck body and for urging the sleeve angularly in the one direction.

Thus with the system of this invention the play created by the loose fit between the stop and the long slot plus the angular biasing of the sleeve allows the system to tighten itself. Of course once the stop comes into angular engagement with the flank of the slot the self-tightening is ended, but the amount of such self-tightening action prior to this engagement is normally sufficient to take up any looseness that develops during a normal drilling operation.

In order to keep the axial displacement of the sleeve necessary to move the stop between the two grooves as short as possible, according to another feature of this invention the two slots are formed at their front ends with a cutout forming a transverse connection region. The axial dimension of this cutout is shorter than the axial length of the stop.

Furthermore, in order the ease the entry of the stop in the slots, they have axially forwardly diverging outer flanks and the stop is formed with complementarily angled outer side surfaces. In addition between the two slots at their front ends there is in the long slot a projecting bump or nose which bears in the one direction against the stop when the sleeve is axially in a retracted position with the locking teeth out of engagement with one another. The stop has on its side confronting the bump a recess into which this bump can enter angularly when the teeth are fully engaged together, thereby creating considerable angular play in this position. The recess is formed by two oppositely inclined surfaces of the side of the stop, which surfaces are themselves complementary to the surfaces of the bump. The interaction of this bump and recess serves to cam the sleeve angularly in a direction loading the spring and putting the play between the stop and long slot on the upstream side of the stop relative to the spring-bias direction.

In fact the bump according to this invention forms an edge that runs over the side of the stop and only moves out of contact with it when the teeth of the sleeve and ring start to engage. This has the advantage that the self-tightening effect of the sleeve starts to work as soon as the locking teeth start to engage axially and this effect is in no way hindered by contact between the stop and the groove. These teeth, in fact, are so angled that they further serve to cam the sleeve angularly against the force of the spring, making the play as great as possible for the maximum amount of self-tightening action.

DESCRIPTION OF THE DRAWING

The above and other features and advantages will become more readily apparent from the following, reference being made to the accompanying drawing in which.

SPECIFIC DESCRIPTION

Figure 1:
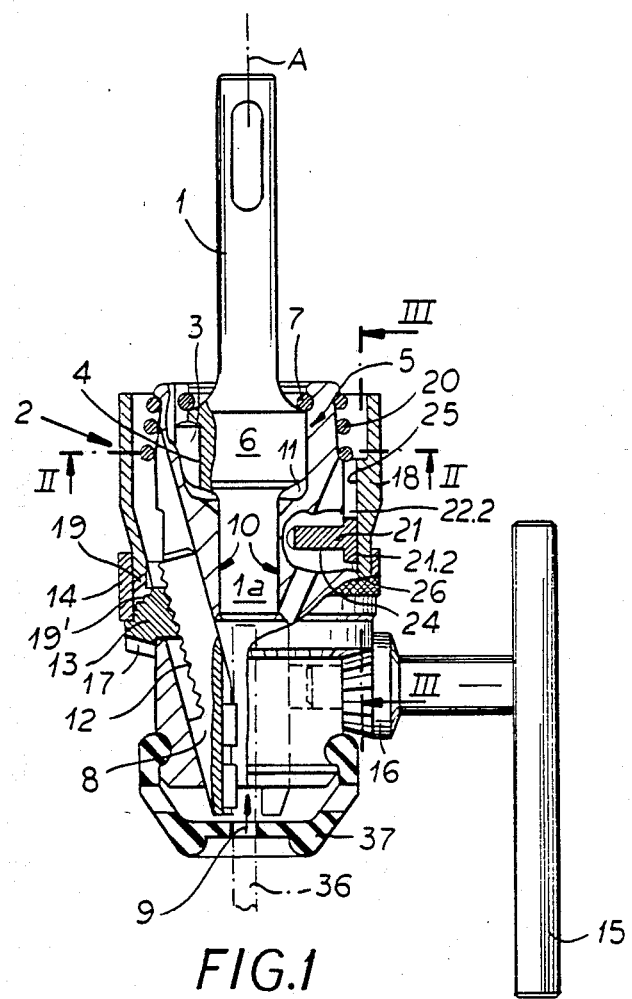
FIG. 1 is an axial section partly in side view of the chuck according to this invention.
Figure 2:
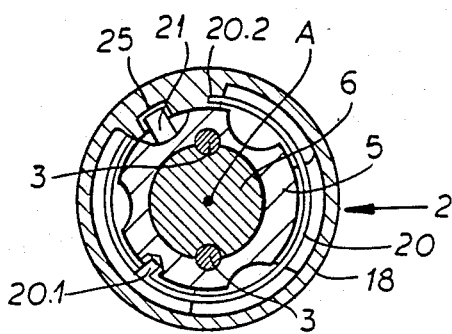
FIG. 2 is a cross section taken along line II—II of FIG. 1.

As seen in FIGS. 1 and 2 the chuck according to the present invention is centered on an axis A and basically comprises a spindle 1, a chuck body 5, jaws 8, an adjustment ring 13, and a locking system 2.

The body 5 is formed with a throughgoing bore 9, 10 having a rear portion 10 and a front portion 9. The front portion 9 normally receives a drill bit whose outline is indicated at 36. A hammer-like front end 1a of the spindle 1 engages in the front portion 10. In addition the rear (upper in FIG. 1) end of the bore 9, 10 has a widened portion 11 receiving a cylindrically enlarged part 6 of the spindle 1. A snap ring 7 retains this part 6 in the widened portion 11 and keys 33 rotationally lock the spindle 1 to the body 5. Slots 4 in the body 5 receiving the keys 3 are substantially longer than these keys 3 permitting relative axial movement of the spindle 1 and body 5. During normal drilling therefore the rotation of the spindle 1 is transmitted via the key 3 to the body 5 and the axial reciprocation of this spindle 1 is effective directly from its hammer end 1a on the rear end of the bit 36.

The chuck body 5 is formed with three guide bores all extending at the same acute angle to the axis A and each receiving a respective one of the jaws 8 which are formed along the rear portion of their outer edges with angled teeth 12. The guide bores have front ends opening into the front portion 9 so that the front ends of the jaws 8 can grip the bit 36, angularly coupling it to the chuck body 5. An elastomeric cuff 37 is engaged over the front end of the chuck body 5 and radially grips the bit 36.

In addition the chuck body 5 is formed generally between the front and rear passage portions 9 and 10 with a radially outwardly open groove receiving the adjustment ring 13 which is formed of two semicircular pieces held together by a knurled sleeve 14. This ring 13 is formed with forwardly directed teeth 17 that can mesh with teeth of a pinion 16 of a chuck key 15 having a pilot pin engageable in a radial hole of the front part of the chuck body 5. The ring 13 is formed with an internal screwthread in mesh with the teeth 12 of the jaws 8. Rotation of the ring 13 in the direction indicated by arrow 28 in FIG. 3c moves the jaws 8 radially inward to clamp the bit 36 and opposite rotation retracts them.

The locking system 2 comprises a sleeve 18 urged axially forward by a spring 20 and axially slidable at its front end in the sleeve 14 holding the ring 13 together. The front end of the sleeve 18 is formed with teeth 16 that can mesh with backwardly directed teeth 19' of the ring 13, these teeth 19 and 19' having 45° inclined flanks 35. A T-shaped stop 21 has a stem 24 fitted in a radial bore in the chuck body 5 and rotationally couples the sleeve 18 to the body 5. Thus when the teeth 19 and 19' are engaged together the ring 13 is locked on the body 5. Pulling the sleeve 18 back against the force of its spring 20 disengages the teeth 19 and 19' from each other and allows the ring 13 to be turned either manually by the ring 14 or by means of the key 16. The spring 20 acts in part like a torque spring, having ends 20.1 and 20.2 respectively fixed as seen in FIG. 2 in the body 4 and sleeve 9 to rotationally urge the sleeve 18 in the tightening direction 28.

Figure 3A:
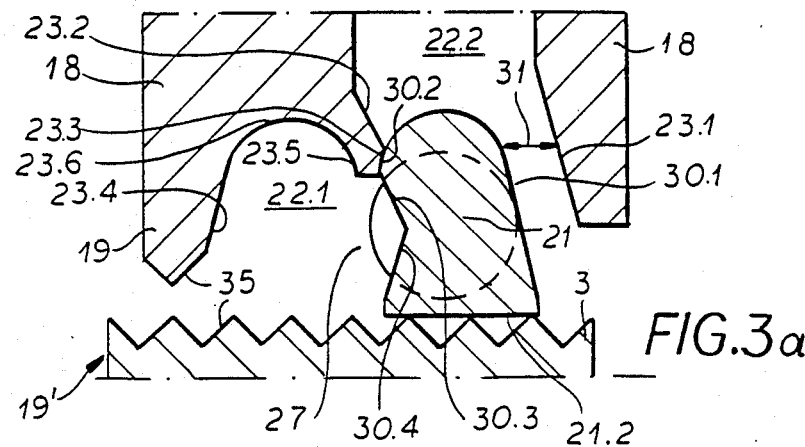
FIGS. 3a, 3b, and 3c are sections in enlarged scale taken along line III—III of FIG. 1 and showing the mechanism in three different positions.
Figure 3B:
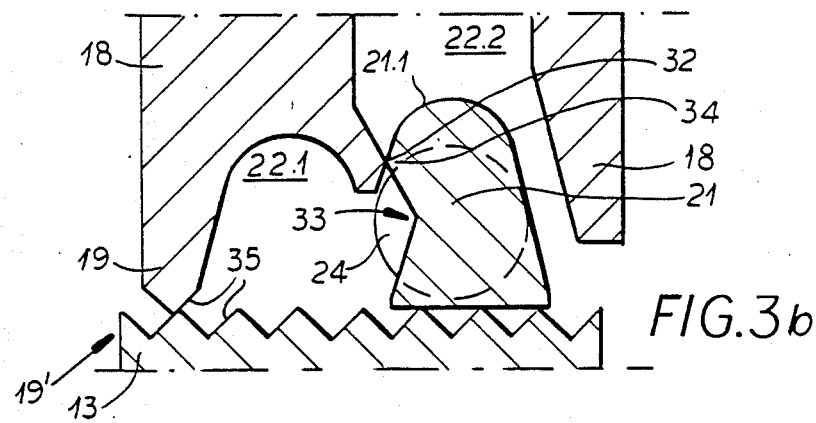
Figure 3C:
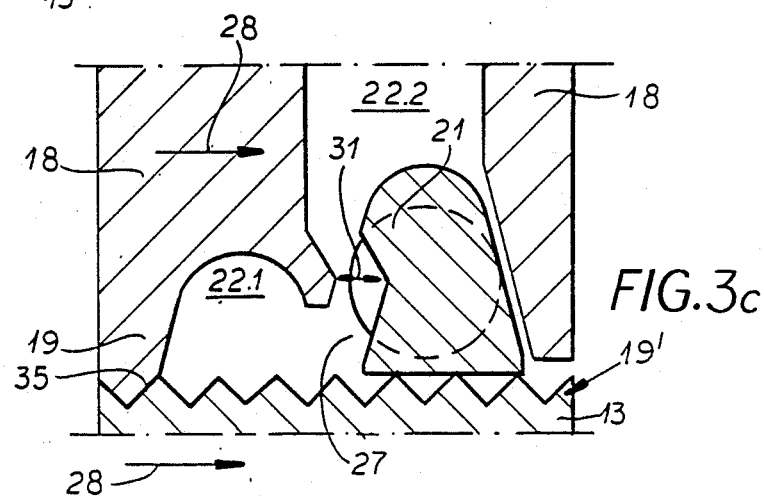

As best seen in FIGS. 3a, 3b, and 3c, the sleeve 18 is formed with a forwardly open short slot 22.1 and a forwardly open long slot 22.2 in which the stop 21 is alternately receivable and which have a floor 25 (FIG. 1) that radially inwardly confronts the stop 21. The stop 21 itself has one side surface 30.1 inclined somewhat to the axis A and an opposite side formed by three surfaces 30.2, 30.3, and 30.4, and is formed with a rearwardly convex rear surface 21.1 and a flat front surface 21.2 fitting with a flat shoulder 26 (FIG. 2) of the sleeve 18. The sleeve 18 is cut out at 27 between the two slots 22.1 and 22.2 to allow the stop 21 to move angularly back and forth between them without having to pull the sleeve 18 back by an axial distance equal to the axial length of the stop 21.

The slot 22.1 has a forwardly concave rear surface 23.6 complementary to the surface 21.1, and the slots 22.1 and 22.2 have outer flanks 23.1 and 23.4 which diverge axially forward at the same angle as the corresponding surfaces 20.1 and 20.2 of the stop 21. These surfaces 23.1 and 23.4 act as angular abutments limiting the angular movement of the stop 21 in the sleeve 18.

Whereas the slot 22.1 has an inner flank surface 23.5 which is spaced from its outer flank 23.4 by a distance equal to the distance between the complementary surface 30.1 and 30.2 of the stop 21 so that the stop 21 can fit snugly in the slot 22.1, the inner flank of the slot 22.2 diverges at 23.2 and 23.3 toward the respective outer flank 23.1, and is spaced by a distance leaving play 31 between the stop 21 and the slot 22.2. These surfaces 23.2 and 23.3 form a bump 32 directed outward and complementary to a bump 34 formed between the surfaces 30.2 and 30.3 of the stop 21. In addition the surfaces 30.3 and 30.4 form a recess 33 complementary to the bump 32.

Thus, assuming that the chuck has been tightened and that the sleeve has been pulled back to move the stop 21 out of the short slot 22.1 and into the long slot 22.2 as shown in FIG. 3a, the angular loading of the spring 20 will push the flank surfaces 23.3 and 30.2 together. As the sleeve 18 is released the sleeve 18 will move axially forward, that is down as shown in FIGS. 3a and 3b, but the teeth 19 and 19' will engage before the flanks 23.3 and 30.2 disengage. The projecting nose 32 will then move into a position axially level with the recess 33, leaving the play 31 between these formations 32 and 33. as shown in FIG. 3c, since the flanks 35 of the teeth 19 and 19' will cam the sleeve 18 somewhat against the biasing direction 28.

The result is therefore that the sleeve 18 can move angularly through the play 31 before being arrested by the stop 21. This play 31 is therefore available for automatic self-tightening of the chuck as it is used. The operator need therefore not readjust continuously, and in fact the amount of the play 31 is normal sufficient to take up any looseness resulting during a normal drilling operation.

I claim:
1. A hammer drill chuck comprising:
    a chuck body centered on an axis and formed with an axially forwardly open hole normally receiving a drill bit;
    respective jaws displaceable in the body and having front ends radially engageable with a bit in the hole;
    an adjustment ring
        engaged around the body,
        fitting with the jaws such that rotation of the ring in one direction advances the jaws in the body and rotation in the opposite direction retracts the jaws for respectively clamping and unclamping the drill bit between the front ends, and
        formed with axially backwardly directed teeth;
    an externally actuatable and accessible locking sleeve axially displaceable on the body and formed with
        forwardly directed teeth engageable with the teeth of the ring for rotational coupling of the sleeve and the ring,
        an axially relatively short, radially inwardly open, and axially forwardly open slot, and
        an axially relatively long, radially inwardly open, and axially forwardly open slot adjacent the short slot and of a predetermined angular width;
    a radially outwardly projecting stop fixed on the chuck body and of a predetermined angular width substantially less than that of the long slot, the stop being engageable in either of the slots and having an angular dimension smaller than the corresponding dimension of the long slot so that when engaged therein the sleeve can move angularly through a predetermined play relative to the body, the stop being so positioned that when engaged in the short slot the teeth of the sleeve are out of engagement with the teeth of the ring; and
    means including a spring engaged between the sleeve and the chuck body for urging the sleeve axially forward on the chuck body and for urging the sleeve angularly in the one direction so as to take up the play.
2. The drill chuck defined in claim 1 wherein the slots are angularly immediately angularly adjacent one another and the sleeve is cut out between them, the axial distance from the cutout to the teeth of the sleeve being shorter than the axial length of the stop.
3. The drill chuck defined in claim 1 wherein the spring is a torque spring having one end seated in the sleeve and an opposite end seated in the body.
4. A hammer drill chuck comprising:
    a chuck body centered on an axis and formed with an axially forwardly open hole noramlly receiving a drill bit;
    respective jaws displaceable in the body and having front ends radially engageable with a bit in the hole;
    an adjustment ring
        engaged around the body,
        fitting with the jaws such that rotation of the ring in one direction advances the jaws in the body and rotation in the opposite direction retracts the jaws for respectively clamping and unclamping the drill bit between the front ends, and
        formed with axially backwardly directed teeth;
    an externally actuatable and accessible locking sleeve axially displaceable on the body and formed with
        forwardly directed teeth engageable with the teeth of the ring for rotational coupling of the sleeve and the ring,
        an axially relatively short, radially inwardly open, and axially forwardly open slot, and
        an axially relatively long, radially inwardly open, and axially forwardly open slot adjacent the short slot and of a predetermined angular width, the slots having axially forwardly diverging outer flanks;
    a radially outwardly projecting stop fixed on the chuck body and of a predetermined angular width substantially less than that of the long slot, the stop being engageable in either of the slots, the stop being so positioned that when enagaged in the short slot the teeth of the sleeve are out of engagement with the teeth of the ring; and
    means including a spring engaged between the sleeve and the chuck body for urging the sleeve axially forward on the chuck body and for urging the sleeve angularly in the one direction, the stop having outer surfaces angled complementarily to the slots.
5. A hammer drill chuck comprising:
    a chuck body centered on an axis and formed with an axially forwardly open hole normally receiving a drill bit;
    respective jaws displaceable in the body and having front ends radially engageable with a bit in the hole;
    an adjustment ring
        engaged around the body,
        fitting with the jaws such that rotation of the ring in one direction advances the jaws in the body and rotation in the opposite direction retracts the jaws for respectively clamping and unclamping the drill bit between the front ends, and
        formed with axially backwardly directed teeth;
    an externally actuatable and accessible locking sleeve axially displaceable on the body and formed with forwardly directed teeth engageable with the teeth of the ring for rotational coupling of the sleeve and the ring, an axially relatively short, radially inwardly open, and axially forwardly open slot, and an axially relatively long, radially inwardly open, and axially forwardly open slot adjacent the short slot and of a predetermined angular width, the long slot having an inner flank angularly confronting its outer flank and formed with a bump projecting angularly in the one direction toward its outer flank;

a radially outwardly projecting stop fixed on the chuck body and of a predetermined angular width substantially less than that of the long slot, the stop being engageable in either of the slots, the stop being so positioned that when engaged in the short slot the teeth of the sleeve are out of engagement with the teeth of the ring, the stop being formed with a recess angularly open in the other direction, complementary to the bump, and angularly engageable with the bump when the teeth are out of axial engagement; and means including a spring engaged between the sleeve and the chuck body for urging the sleeve axially forward on the chuck body and for urging the sleeve angularly in the one direction.

6. The drill chuck defined in claim 5 wherein the bump and recess have complementary angled camming surfaces flatly engageable with each other when the teeth are out of axial engagement.

7. The drill chuck defined in claim 6 wherein the bump has an edge that leaves engagement with the stop on axial engagement of the teeth.

8. The drill chuck defined in claim 7 wherein the teeth have complementary angled flanks and are axially spaced from the edge such that they cam the sleeve angularly in the opposite direction on axial engagement of the teeth.

* * * * *